United States Patent [19]

Anderson

[11] 3,757,795
[45] Sept. 11, 1973

[54] POWER SUPPLY AND VOLTAGE DOUBLE OUTPUT CIRCUITRY FOR IMPLANTABLE ELECTRO-MEDICAL APPARATUS

[75] Inventor: Robert K. Anderson, Minneapolis, Minn.

[73] Assignee: Medtronic, Inc., Minneapolis, Minn.

[22] Filed: Feb. 11, 1971

[21] Appl. No.: 114,734

Related U.S. Application Data

[63] Continuation of Ser. No. 770,965, Oct. 28, 1968, abandoned.

[52] U.S. Cl. ............... 128/419 P, 307/48, 307/66, 307/86, 307/110, 320/1
[51] Int. Cl. .............................................. A61n 1/36
[58] Field of Search ................. 128/419 P, 424, 48; 307/64–66, 71, 80, 89, 86, 110, 264; 320/1

[56] References Cited
UNITED STATES PATENTS

| | | | |
|---|---|---|---|
| 3,521,641 | 7/1970 | Farensbach | 128/422 |
| 3,454,012 | 7/1969 | Raddi | 128/419 P |
| 3,431,912 | 11/1969 | Keller, Jr. | 128/419 P |
| 3,195,540 | 7/1965 | Waller | 128/419 P |
| 3,195,540 | 7/1965 | Waller | 128/422 |
| 3,454,012 | 7/1969 | Raddi | 128/422 |

FOREIGN PATENTS OR APPLICATIONS

| | | | |
|---|---|---|---|
| 225,033 | 10/1959 | Australia | 128/419 R |
| 225,033 | 10/1959 | Australia | 307/64 |

Primary Examiner—William E. Kamm
Attorney—Lew Schwartz

[57] ABSTRACT

Implantable electrical medical apparatus having a redundant power supply to overcome problems of battery failure, and in combination with an output voltage doubler to avoid increasing the number of batteries when the redundant supply is used.

7 Claims, 3 Drawing Figures

PATENTED SEP 11 1973 3,757,795
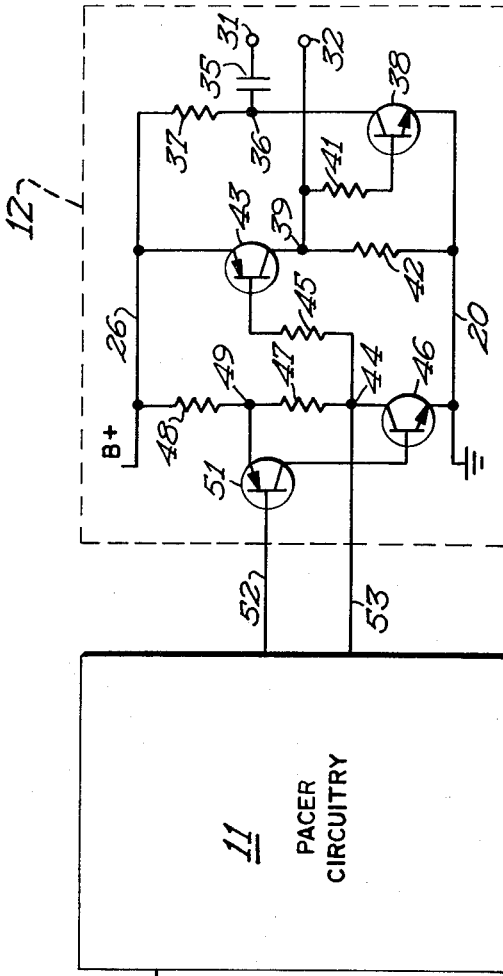
FIG 2
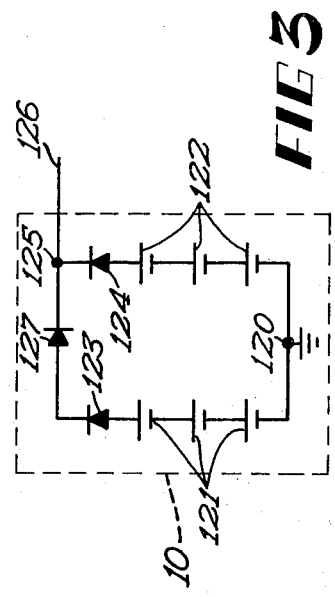
FIG 3
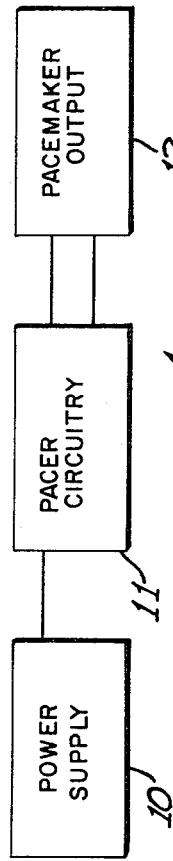
FIG 1
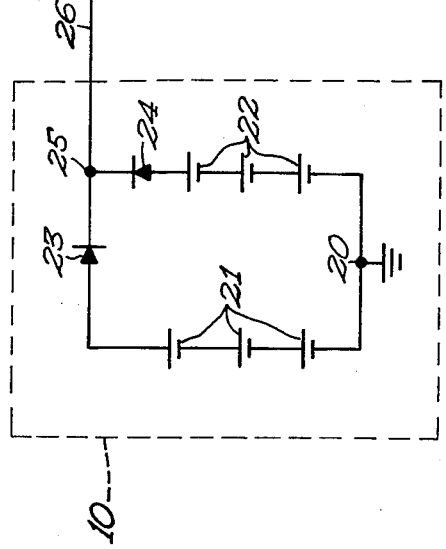
INVENTOR.
ROBERT K. ANDERSON
BY Lew Schwartz
ATTORNEY 3,757,795

POWER SUPPLY AND VOLTAGE DOUBLE OUTPUT CIRCUITRY FOR IMPLANTABLE ELECTRO-MEDICAL APPARATUS

REFERENCE TO RELATED APPLICATIONS

This application is a continuation of U.S. Pat. Application Ser. No. 770,965, filed Oct. 28, 1968 and now abandoned, entitled POWER SUPPLY FOR IMPLANTABLE ELECTRO-MEDICAL APPARATUS.

BACKGROUND OF THE INVENTION

Various implantable electrical medical devices are well known in the art. Examples of such devices are the Greatbatch Cardiac Pacemaker shown in U.S. Pat. No. 3,057,356, and the Bradley Bladder Stimulator shown in U.S. Pat. No. 3,236,240. In a totally implantable device, that is one which includes its own power supply, a problem which arises is the usable life of the source of energy, such as batteries. If batteries fail before their expected lifetime, a dangerous situation will exist for the patient in whom the apparatus was implanted. Prior art attempts to overcome this problem have involved the use of a plurality of serially connected batteries, and stacks of parallel legs of serially connected batteries, for example. However, the problem of battery failure remains a serious one. It is to overcome this problem that the present invention is designed.

SUMMARY OF THE INVENTION

Briefly described, the apparatus of this invention comprises a redundant power supply for use with implantable electrical medical apparatus. The invention includes a combination of such implantable apparatus with a power supply including first and second sources of electrical energy each having a common polarity attached to one energy output terminal, and the other polarity connected through a diode to another energy output terminal. Thus, if the two energy sources, such as batteries, have substantially equal voltages, the diodes of each leg will conduct and the two sources will essentially be in parallel. If the voltage of one source of energy should drop sufficiently below the level of the other, the respective diode will become back-biased by the greater voltage from the other source of energy, and only the leg with the greater voltage will conduct. However, the leg with the lower voltage remains as a redundant supply to take over when the conducting leg has dropped to a voltage below that of the redundant source, at which time the back-biasing of the diode will be reversed, and the function of the two sources will be reversed. A variation of the above apparatus includes the use of a pair of diodes to connect one of the sources to the output terminal, so as to define that source as the redundant one, at the initiation of the operation of the apparatus.

In the preferred embodiment, to avoid increasing the number of batteries necessary to use the redundant system described above, the redundant power supply apparatus is combined with voltage doubling apparatus at the output of the electrical medical apparatus.

BRIEF DESCRIPTION OF THE DRAWINGS

FIG. 1 discloses a block diagram of the apparatus of this invention;

FIG. 2 discloses schematics of the apparatus of this invention; and

FIG. 3 discloses a schematic of a variation of the apparatus of this invention.

DESCRIPTION OF THE PREFERRED EMBODIMENTS

Referring first to FIG. 1, there is disclosed a block diagram of the combination comprising the apparatus of this invention. Block 10 comprises a power supply which provides power to an implantable medical device such as the device described in U.S. Pat. No. 3,057,356 mentioned in the BACKGROUND OF THE INVENTION above. In FIG. 1 the implantable apparatus is shown as pacer circuitry 11, having a output circuit 12. It is to be understood that reference to heart pacer circuitry is not intended to limit the scope of this invention, which will apply to other implantable electrical medical apparatus as well.

Referring now to FIG. 2, schematics are shown within the dotted lines representing blocks 10 and 12 of FIG. 1. As the circuitry of block 11 may be any one of a number of known designs, it is just representatively shown in block diagram in FIG. 2.

Referring to block 10 of FIG. 2, there is shown a ground bus 20. A first group of serially connected batteries 21 has a negative output terminal connected to bus 20. A second group of serially connected batteries 22 has its negative output terminal connected to bus 20. The positive output terminal of batteries 21 is connected through a diode 23 to a junction 25. The positive output terminal of batteries 22 is connected through a diode 24 to junction 25. Junction 25 is connected to a positive bus, or B+ line, 26.

When the apparatus of FIG. 1 is implanted and operation commences, batteries 21 and 22 will provide, theoretically, approximately equal voltage outputs. In that case, both diodes 23 and 24 will be forward-biased, and the two groups of batteries 21 and 22 will provide power between busses 20 and 26 as though they were connected in parallel. However, if at the beginning of operation either of groups of batteries 21 and 22 has a lower voltage than the other, or if during operation the voltage of either of groups 21 and 22 drops lower than the other, or if a single battery in either of groups 21 and 22 should fail, then the group of batteries with the greater voltage will take over to provide sole power to the circuitry 11.

The above is accomplished as follows: assume first that the voltage of batteries 21 has dropped below the voltage of batteries 22. This will place a back-bias on diode 23, which, if sufficient, will prevent current flow from batteries 21 to bus 26. Therefore, batteries 22 will provide the total power input into circuitry 11.

Assume now that the group of batteries 22 has operated for a sufficiently long time so that its voltage output becomes less than the output of the group of batteries 21. In that case, the situation would be reversed, and a reverse-bias would appear on diode 24 while diode 23 would now be forward-biased and batteries 21 would supply the sole power to bus 26. Observe that the same would be true for a sudden battery failure in the group of batteries 22.

It thus becomes apparent that each group of batteries 21 and 22 operates as a redundant power supply, one for the other. The advantages of the apparatus of this invention in providing such a redundant power supply will also be apparent, in that sudden power failure, or power failure before the expected lifetime of the sources of energy, could cause a dangerous situation for the person in whom the apparatus is implanted.

Referring now to block 12 of FIG. 2, as indicated by the dotted lines, there is shown a schematic for a voltage doubler. In the combination of the apparatus of this invention, a voltage doubler such as 12 is preferable, to avoid increasing the number of batteries necessary to achieve the redundant power supply of block 10.

In block 12 there are shown a pair of output terminals 31 and 32 which, in implantation, would be attached to that portion of the body it is desired to stimulate with electrical signals. In a heart pacer, terminals 31 and 32 would be connected by electrodes to a portion of the heart. Terminal 31 is connected through a capacitor 35 to a junction 36. Junction 36 is connected through a resistor 37 to the B+ line, or positive bus 26. Junction 36 is also connected through an NPN transistor 38 to bus 20. Terminal 32 is connected to a junction 39. Junction 39 is connected through a PNP transistor 43 to bus 26, through a resistor 42 to bus 20, and through a resistor 41 to the base electrode of transistor 38. The base electrode of transistor 43 is connected through a resistor 45 to a junction 44. Junction 44 is connected through a resistor 47 to a junction 49, and junction 49 is connected through a resistor 48 to bus 26. Junction 44 is also connected through an NPN transistor 46 to bus 20. Junction 49 is connected through a PNP transistor 51 to the base electrode of transistor 46. A pair of input leads 52 and 53 are connected, respectively, to the base electrode of transistor 51 and to junction 44.

The operation of the schematic of block 12 is best understood by first assuming that the signal from block 11 to leads 52 and 53 is such that transistor 51 is held off. With transistor 51 off, transistor 46 will be off and junction 44 will be at a sufficiently high level to bias off transistor 43. With transistor 43 off the base of transistor 38 will be at essentially ground potential to hold it off. Thus all of the transistors, which constitute electrical switches, are in an off or open state. In this state, it will be recognized that a current will flow from the positive bus 26 through resistor 37 and capacitor 35, thence out terminal 31 through the portion of the body to which terminals 31 and 32 are connected, back into terminal 32 and through resistor 42 to the ground bus 20. This flow of current will continue until capacitor 35 is fully charged. Note that capacitor 35 will charge such as to be positive on the plate connected to junction 36.

When an electrical output signal is desired by the timing circuitry of block 11, a signal will appear between leads 52 and 53 to bias on transistor 51. The flow of current through transistor 51 will be felt on the base of transistor 46 to turn it on. When transistor 46 turns on junction 44 will go to approximately ground voltage, thus biasing on transistor 43. The turn-on of transistor 43 will cause junction 39 to rise to a positive voltage, thus biasing on transistor 38. In this state, it will be noted that all of the transistors or electrical switches, are in the on or conducting condition.

It will now be apparent that the primary current flow path through capacitor 35 is completely reversed. That is, the conduction path is from bus 26 through transistor 43 and junction 39, out through terminal 32 through the portion of the body to which the electrodes are connected and back into terminal 31, and then through capacitor 35 in the opposite direction to the prior current flow, through junction 36 and then through transistor 38 to ground bus 20. This reversal of current flow path puts the voltage available between busses 26 and 20 in series with the voltage stored in capacitor 35, to double the output voltage available. Thus, the voltage available between busses 20 and 26, as supplied by power supply 10, need only be half as great.

When the desired output pulse time has passed, the signal between leads 52 and 53 will either disappear or be reversed, and all of the transistors will turn off as described above initially. When this occurs, the cycle will begin again with the recharging of capacitor 35 in the original direction.

Referring now to FIG. 3, there is shown a variation of the portion of the apparatus of this invention described with reference to block 10 of FIG. 2. In FIG. 3 there is again shown block 10 in dotted lines. Bus 120, batteries 121, batteries 122, and diodes 123 and 124, and junction 125 connected to bus 126 are representations of the circuit elements connected exactly as described for those elements similarly numbered in the discussion of block 10 of FIG. 2. However, in the schematic of FIG. 3 a third diode 127 is shown connected between diode 123 and junction 125. This added diode has the effect of increasing the amount of voltage necessary to forward bias diode 123 and 127. Therefore, the group of batteries 121 can, at the initiation of operation of the apparatus of FIG. 1, be said to be the redundant group to the primary group of batteries 122. This of course assumes that fresh groups of batteries 121 and 122 will be of essentially equal voltages. This embodiment of the apparatus of this invention may be preferable when it is desired to made one group of batteries definitely redundant to another group of batteries at the initiation of operation.

It will be apparent from the above descriptions that the apparatus of this invention comprises a unique combination which overcomes a possibly dangerous disadvantage of prior known implantable electrical medical apparatus. The embodiments described above are preferred, but are in no way intended to limit the scope of this invention. Further, the inventive combination described above can be used in many types of implantable electrical medical devices in addition to the heart pacer shown in the drawings and described above.

I claim:

1. In implantable electrical medical apparatus including circuit means for developing electrical signals for stimulating selected portions of a body, the improvement comprising: electrically redundant power supply means for providing electrical energy to the circuit means; voltage doubling circuit means connected to the circuit means for doubling the electrical signals for stimulating; capacitance means in said voltage doubler means; and switch means alternatively connecting said capacitance means to said power supply means from a first connection for charging said capacitance means to a further connection for putting said capacitance means and said power supply means in series aiding configuration with regard to the electrical signals for stimulating.

2. The apparatus of claim 1 in which said electrically redundant power supply means includes: electrical energy supply means having at least a pair of supply output terminals connected to the circuit means; said supply means comprising a plurality of sources of electrical energy having first and second output terminals; means connecting said first output terminal of at least a first and second of said sources of energy to one of said pair of supply output terminals; first and second asymmetric current conducting means connecting respectively, said second output terminal of said first and second sources of energy to the other of said supply output terminals.

3. The apparatus of claim 2 in which: the reverse bias levels of said first and second asymmetric current conducting means are unequal.

4. The apparatus of claim 2 in which: the reverse bias levels of said first and second asymmetric current conducting means are equal.

5. The apparatus of claim 2 in which: one of said first and second asymmetric conducting means comprises at least a pair of serially connected diodes; the other of said first and second asymmetric current conducting means comprises one or more serially connected diodes including less diodes than said one asymmetric current conducting means; and all said diodes have approximately the same electrical characteristics.

6. Implantable electrical medical apparatus including circuit means for developing electrical signals for stimulating selected portions of a body, comprising: electrically redundant power supply means having a pair of supply junctions; means connecting said circuit means to said supply junctions; voltage doubling means having first and second output terminals adapted to be connected to a body for electrical stimulation thereof; said voltage doubling means including a capacitor having a pair of plates; means connecting one of said plates to one of said supply junctions; means connecting the other of said plates to said first output terminal; means connecting said second output terminal to the other supply junction; electrical switch means connecting said one plate to said other supply junction; further electrical switch means connecting said second output terminal to said one supply junction; and all said switch means being connected to said circuit means and including means for selectably reversing the polarity of electrical energy to said capacitor.

7. In implantable electrical medical apparatus, including circuit means for developing electrical signals, the improvement comprising:

at least first and second substantially equal sources of electrical energy having two outputs of opposite polarity; first and second junctions; means connecting the same polarity output on each of said sources to said first junction; diode means connecting the other polarity output of said first source to said second junction; further diode means connecting the other polarity output of said second source to said second junction; said first and second junctions connected to the circuit means; energy storage means having first and second terminals; first output means connected to said first terminal; second output means; impedance means connecting said second output means to said first junction; impedance means connecting said second terminal to said second junction; first switch means connecting said second output means to said second junction; second switch means connecting said second terminal to said first junction; said first and second switch means operably connected to said circuit means for switching the polarity of electrical energy to said energy storing means.

* * * * *